United States Patent [19]
Caron

[11] 3,914,027
[45] Oct. 21, 1975

[54] VARIABLE OPACITY LIGHT FILTERING APPARATUS FOR A WELDER'S HELMET

[75] Inventor: Thomas E. Caron, Crystal, Minn.

[73] Assignee: Nu-Vu Company of Wisconsin, Inc., Nashotah, Wis.

[22] Filed: Oct. 1, 1973

[21] Appl. No.: 402,588

[52] U.S. Cl. .................................. 350/267; 350/312
[51] Int. Cl.² ......................................... G05D 25/00
[58] Field of Search ............. 350/267, 312; 219/147

[56] References Cited
UNITED STATES PATENTS

| | | | |
|---|---|---|---|
| 2,761,046 | 8/1956 | Herrick et al. | 219/147 |
| 3,001,300 | 9/1961 | Green | 350/267 UX |
| 3,344,434 | 10/1967 | Beckmann et al. | 350/267 X |
| 3,424,515 | 1/1969 | Risk | 350/267 X |

*Primary Examiner*—Ronald L. Wibert
*Assistant Examiner*—Matthew W. Koren
*Attorney, Agent, or Firm*—Williamson, Bains & Moore

[57] ABSTRACT

An improved variable opacity light filtering apparatus for a welder's helmet comprises a pair of generally parallel, confronting, juxtaposed and transparent panels having matched, closely adjacent peripheries which are interconnected by a stretchable fluid-tight seal to define a fluid receiving chamber between panels and seal. The panels are mounted across the viewing aperture of the welding helmet and a supply of light-obstructing fluid is selectively transferred between a reservoir and the chamber by means of a spring biased electrical solenoid coupled to a diaphragm in the reservoir. Fluid moving into the chamber moves the panels from an unextended position wherein the panels are closely adjacent to an extended position wherein the panels are spaced farther apart, substantially increasing the opacity of the chamber and protecting the eyes of the welder from excessive light generated from welding. A pair of adjacent, elongated parallel edges of the panels is beveled to define a slot therebetween, and a manifold positioned along the slot is adhesively retained by the seal and moves into and out of the slot as the panels move between extended and unextended positions, aiding the transfer of fluid between manifold and chamber. The spring biased solenoid results in the rapid darkening of the chamber needed for protection while providing the more gradual lightening of the chamber required to permit the eyes to adapt comfortably to the changing light.

8 Claims, 4 Drawing Figures

U.S. Patent  Oct. 21, 1975  3,914,027
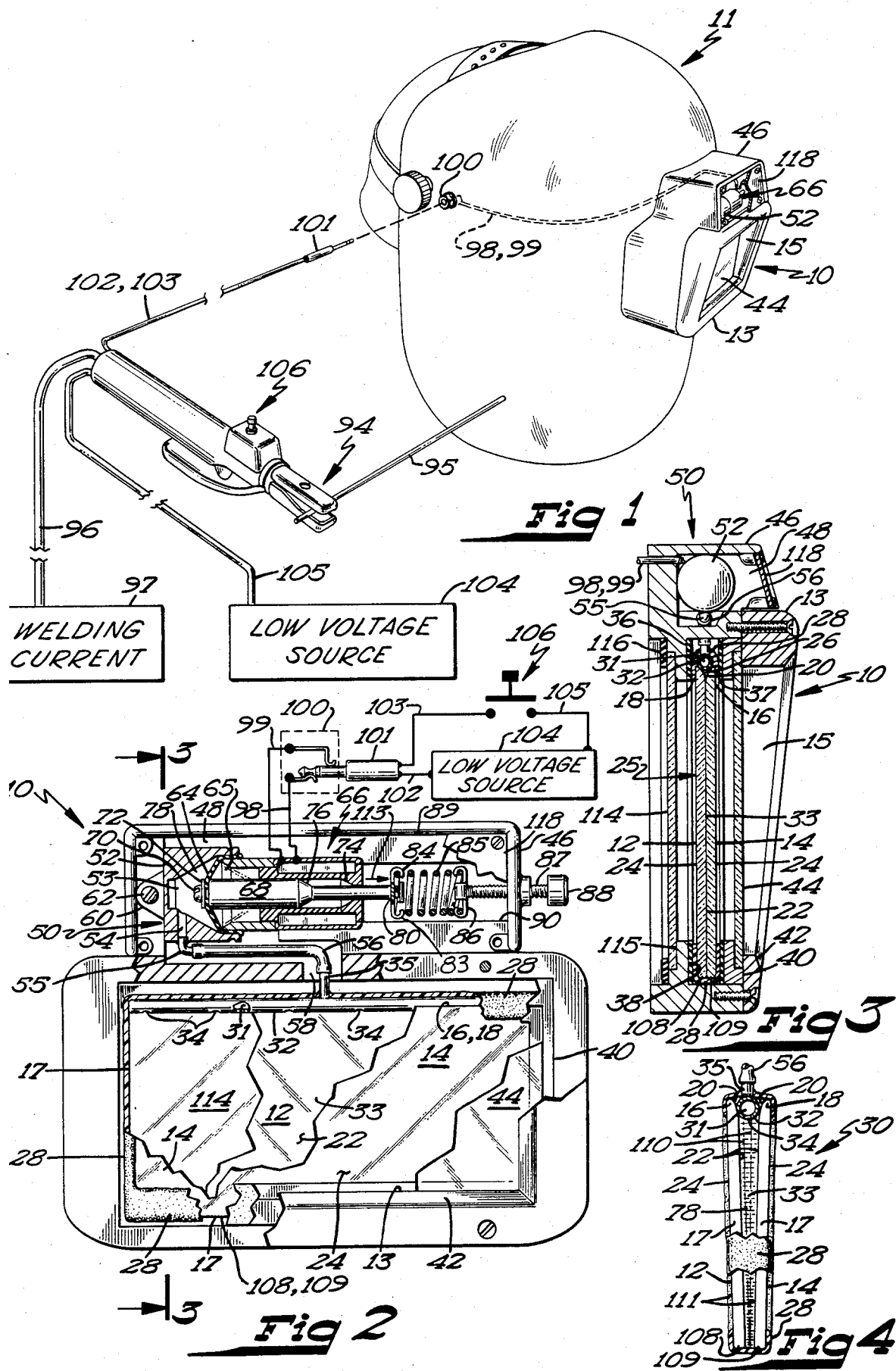

VARIABLE OPACITY LIGHT FILTERING APPARATUS FOR A WELDER'S HELMET

BACKGROUND OF THE INVENTION

Commercially available welder's helmets are provided with a light filtering plate which is swingably mounted to the helmet to alternatively obstruct the viewing aperture and to be swung clear thereof, permitting the welder to inspect and set up his work without using the filter plate and to effectively shield his eyes from intense welding light by flipping the filtering plate to a filtering position across the viewing aperture.

While available helmets provide adequate protection from the intense welding light, such helmets are difficult to operate if both of the welder's hands are occupied in the welding operation. Often he needs both hands in holding an electrode, clamp or the like and it becomes difficult to use a hand to swing the filtering plate across the viewing aperture of such a helmet.

Another commonly used helmet is supported on the wearer's head by a hard hat or webbing and a pivotally mounted face mask swings upwardly to a position above the wearer's head clear of his face. To swing the helmet to a closed position over the face the wearer gives his head a sharp forward nod or snap to jerk the swingably mounted face mask to a closed position over his face as he simultaneously ignites the arc. The sharp nod or snap required to swing the mask into obstructing position is not easily mastered and can cause the welder's hands to shift their position sufficiently to relocate the position of the weld from the intended position. The acquiring of the necessary head movement to properly move the face mask to a closed position without inadvertently repositioning the weld requires extensive training and is particularly bothersome and discouraging to the inexperienced or student welder. It is desirable that the snapping movement now required to properly position the face mask be eliminated to permit a welder's full attention to be directed to his workpiece and extraneous head movements avoided. Another problem encountered with such face masks is that the pivotal mounting between face mask and webbing tends to loosen with increased use and results in the face mask failing to stay in raised position and instead slipping forwardly to cover the face even when unneeded. This unwanted movement can have substantial nuisance value for a welder concentrating on the setting up of his joints and equipment. Still another disadvantage of the pivoting face mask is that the striking of neck or chin by the mask as it drops to closed position can be uncomfortable and painful to the wearer. It is desirable to provide a welding helmet which can be lightened or darkened without swinging the filtering plate or face mask. It is imperative that the welding helmet be safe, reliable, easily controlled, and the transition from transparency to darkened condition must be substantially instantaneous to protect the user from the welding arc. It so also desirable, however, that the filter plate should make the transition from darkened condition to transparency more gradually in order that the eyes may more easily adjust to the changing light intensity.

BRIEF SUMMARY OF THE INVENTION

The invention relates to the field of welding helmets and comprises an improved helmet with a variable opacity light filtering apparatus selectively electrically controllable by the operator.

A pair of fluid impervious panels made of at least partially transparent material is placed in confronting, juxtaposed relationship with one another, the plates being provided with matching closely adjacent peripheries which are interconnected by a stretchable, fluidtight seal. The adjacent panels and interconnecting seal define a fluid receiving chamber into which light obstructing fluid may be delivered to urge the panels outwardly from an unextended position to an extended position wherein the chamber contains sufficient light obstructing fluid to substantially reduce light transmission therethrough. The interconnected panels are positioned across the viewing aperture of a welder's helmet in place of the standard darkened filter plate now used with such helmets.

A fluid transfer device is carried by the helmet and connected in fluid flow relationship with the chamber to deliver the fluid to and from the chamber. The transfer device includes a fluid reservoir in fluid flow communication with an elongate manifold within the chamber, the manifold being along and closely adjacent a slot defined by bevels on a pair of adjacent and parallel edges of the confronting panels. The transfer device further includes a diaphragm in the reservoir and in contact with the fluid, the diaphragm being coupled to a moving plunger of an electrical solenoid. The solenoid is electrically connected to a source of power, and a push button switch mounted on a welding electrode holder permits the operator to energize the solenoid with the same hand that grips the electrode holder, thus eliminating the manual swinging of a filtering plate toward and away from the viewing aperture.

A spring is connected between the helmet and the electrical solenoid to bias the moving plunger in a predetermined position adapted to apply pressure to the diaphragm to insure that a predetermined amount of fluid is normally retained within the chamber to keep the panels in an extended position in which the chamber blocks most incident light, the chamber becoming transparent when the solenoid is energized and fluid is withdrawn from the chamber. It is desirable that the chamber fill rapidly with fluid for immediate darkening to provide protection to the operator whereas it is desirable that the fluid be removed from the chamber somewhat more slowly to gradually lighten the chamber so an operator's eyes can gradually adapt themselves to the changing light. The operating characteristics of spring and solenoid are selected to achieve this object.

The manifold is adhesively retained by the seal and has a plurality of exit orifices therealong which are directed towards the slot to deliver fluid into the chamber at spaced intervals along the length of the manifold. As fluid enters the chamber, the manifold moves downwardly into the slot as the seal stretches, wedging the panels apart and increasing the rate at which fluid is received by the chamber. As the top of the chamber expands, the manifold acts as a pivot about which the lower periphery of the panels may move outwardly away from one another as the lower portion of the chamber expands. Accordingly, the manifold aids in rapidly delivering fluid to the chamber and in evacuating it when required.

These and other advantages of the invention will more fully appear from the appended drawings and the following description in which the same reference numerals refer to the identical components shown in the various views.

BRIEF DESCRIPTION OF THE DRAWINGS

FIG. 1 is a perspective, partially sectional view of a welding helmet embodying the variable opacity filtering apparatus invention;

FIG. 2 is a front elevation view, partially broken away, of an embodiment of the light filtering apparatus of FIG. 1;

FIG. 3 is a sectional side elevational view of the apparatus of FIGS. 1 and 2 taken along the direction of cutting plane 3—3 of FIG. 2 and showing the panels in unextended position.

FIG. 4 is a sectional side elevational view, partially in phantom, showing the panels of FIG. 3 in extended position.

MAIN DESCRIPTION

Referring now to FIGS. 1–3, a welder's helmet 11 with a standard tunnel 13 is equipped with variable opacity light filtering apparatus 10, having a pair of panels 12 and 14 positioned across viewing aperture 15 of tunnel 13.

The panels 12 and 14 are formed of fluid impervious material such as glass or plastic-like material, the material permitting at least partial transmission of the visible light spectrum through the panel. Panels 12 and 14 are aligned in confronting, juxtaposed, generally parallel relationship with one another and their peripheries 17 are shaped to be generally matching and closely adjacent. While the shown rectangular periphery 17 is preferred, other geometrical shapes are possible and within the purview of the invention.

The panels 12 and 14 are provided with a generally elongated, preferably straight edge 16 and 18, respectively, each of which is provided with a smoothly rounded bevel 20 extending from the inner surface 22 of each panel can curving outwardly toward the outer surface 24. When panels 12 and 14 are in unextended position 25 (FIG. 3) wherein the panels are spaced a first distance apart which may be so close as to be touching, the adjacent bevels 20 confront one another and cooperate to define a slot 26 therebetween.

A stretchable seal 28 is applied to the peripheries 17 of each of the panels 12 and 14, interconnecting the panels and forming a fluid-tight seal. The panels 12 and 14 and the seal 28 interconnecting their peripheries define a fluid receiving chamber 33 therebetween. The material forming the seal 28 may be a resinous material or other type fluid impervious sealant but should be stretchable to permit the panels 12 and 14 to move outwardly to an extended position 30 (FIG. 4) in which the panels are spaced a second distance apart and the intervening chamber 33 is filled with a light obstructing fluid 78. As the panels 12 and 14 move to the position 30, the seal 28 stretches and in stretching generates a restoring force tending to pull the panels toward one another.

If desired, the bevels 20 may be angled rather than curved, but it is preferred that the rounded bevel be used for reasons which will be described further hereafter.

An elongate manifold 32 is positioned within the chamber 33 adjacent the slot 26 and parallel to the edges 16 and 18. The manifold may be formed of metal tubing, has a hollow fluid channel 31 and is provided with a plurality of exit orifices 34 positioned therealong and downwardly directed to release fluid into the slot 26 of chamber 33. An entrance 35 to the manifold 32 passes through the seal 28, the seal fitting tightly about the entrance 35 to prevent the escape of fluid from the chamber 33. The seal 28 adhesively retains the manifold 32 causing the manifold to move toward and away from slot 26 with the seal as the panels 12 and 14 move toward and away from one another to produce advantages which will be described hereafter.

The sealed panels 12 and 14 with the enclosed manifold 32 are positioned across the viewing aperture 15 of the helmet 11, the panels being inserted within the tunnel 13 and placed between resilient spacer gaskets 36 and 37, the gasket 36 positioned against shoulder 38. A spacer frame 40 is positioned against the gasket 37 and attached to the helmet 11 be screws passed through outer frame flange 42, the resilient gaskets permitting the panels 12 and 14 to move to extended position 30 as will be discussed hereafter. If desired, an outer transparent protective lens 44 may be contained within the spacer frame 40 to provide protection for the panel 14.

A housing 46 extends forwardly from the helmet 11 above and contiguous with the tunnel 13, the housing having a cavity 49 therein for containment of a portion of the fluid transfer device 50 used with the invention.

Referring now to FIG. 2, reservoir casing 52 contains an inner reservoir 53 from which a channel 54 extends outwardly terminating at nozzle 55. A length of tubing or hose 56 is fitted between the nozzle 55 and the entrance 35 of manifold 32, interconnecting them in sealed fluid flow relationship, the hose 56 extending along a groove 58 extending from cavity 48 to viewing aperture 15. A tab 60 extends from the end of casing 52, and a screw 62 is passed therethrough to engage the housing 46, thereby anchoring the reservoir casing 52 within the cavity.

A diaphragm 64 formed of rubber-like material or the equivalent is positioned over the end 65 of solenoid 66, the edges of the diaphragm being held against the end 65 by means of the reservoir casing 52 being force fitted over the end 65 to retain the diaphragm therebetween. The moving plunger 68 of the solenoid has the end adjacent diaphragm 64 tapped to receive screw 70 which is tightened over washer 72 to contain the diaphragm 64 between the washer and the adjacent end of the plunger 68, forming a fluid tight seal to contain fluid 78 within the reservoir 53 and preventing its escape into the solenoid 66. The diaphragm 64 mounted in the reservoir 53 provides a means for moving fluid 78 into and out of the reservoir.

While a simple form of diaphragm is shown in FIG. 2, it should be understood that other known diaphragms may be substituted, such as a rolling diaphragm, and all such alternatives are within the purview of the invention. It should also be understood that while a diaphragm has been used to control fluid flow into and out of a reservoir 53, a reservoir utilizing a moving piston could be substituted and accordingly, such pistons or the like may serve as a means for moving fluid in and out of the reservoir and are within the purview of the invention.

The plunger 68 of solenoid 66 is mounted for sliding movement between an unenergized position 76 where the diaphragm is well advanced into reservoir 53 and an energized position 74 where the diaphragm 64 moves toward solenoid 66 drawing fluid from chamber 33 to the reservoir.

The light obstructing fluid 78 filling reservoir 53 comprises a liquid carrier containing any of various coloring agents, dyes or the like; the carrier selected should exhibit no adverse effects such as freezing or thickening at temperature extremes and should retain the dye or coloring agent in solution without precipitation or the like for the expected life of the apparatus 10. The coloring agent may be of any desired color but should be sufficiently intense that a thickness of fluid of approximately 0.010 inches will provide an almost opaque layer. Viscosity of the fluid carrier should not be unduly thick or heavy so that the liquid may be readily delivered to or withdrawn from the chamber 33. While a great number of colored liquids may be utilized, a solution of ethylene glycol and food coloring has produced satisfactory results.

The remaining end 80 of the moving plunger 68 is connected to spring retaining fitting 83. The fitting 83 has a plurality of ears 84 which grip an end of coil spring 85. The remaining end of the spring 85 is retained by an identical fitting 86 which is pivotally mounted to a threaded shaft 87 having an adjusting nob 88 and threaded through the housing 46.

The nob 88 of shaft 87 is rotated to advance or retract screw 87 to tension the spring 85, causing it to exert a restoring force on the moving plunger 68, resulting in the plunger 68 being biased in the position 76 forcing fluid from reservoir 53 to the chamber 33 to darken it. The spring 85 assures the the plunger and diaphragm remain in the position 76 to keep the chamber substantially darkened unless the solenoid 66 is energized. It is desirable that the spring 85 exert sufficient force on the plunger 68 to cause the plunger to move immediately from energized position 74 to unenergized or rest position 76 whenever the solenoid is deenergized. This is desirable because the transition from virtual transparency of the chamber 33 to substantial darkening thereof should be essentially immediate to assure that the welder's eyes are protected from the bright welding arc. By contrast, the solenoid 66 is selected to exert sufficient force on the plunger 68 to move it to an energized condition 74 in a time period greater than that required for the spring 85 to darken the chamber. Accordingly when it is desired to clear the chamber 33, the solenoid is energized and has an operating characteristic adapted to cause the chamber 33 to clear gradually, thereby permitting an operator's eyes to adjust to the increasing light intensity as normal daylight enters the helmet. The spring coefficient of the spring 85 is selected to be high enough to assure an adequate force to rapidly darken the chamber 33 in a first predetermined time interval substantially less than the time interval required for the solenoid 66 to return the chamber to its most transparent condition.

The manifold 32, hose 56, the light obstructing fluid 78, the reservoir casing 52 and reservoir 53, diaphragm 64, solenoid 66 and spring 85 connected between solenoid and case 46 collectively comprise a fluid transfer device for selectively delivering fluid 78 between the reservoir 72 and the chamber 33 when the solenoid is electrically energized.

The components of the fluid transfer device 50 which are positioned within the cavity 48 are retained in position by the screw 62 and by the screw shaft 87 which is connected through the spring 85 to the end 80 of plunger 68. The device 50 is further contained by closely fitted shoulders 89 and 90 which prevent lateral shifting or movement of the solenoid and reservoir.

A specially equipped welding electrode holder 94 with standard spring loaded jaws for gripping a weld rod 95 is connected by wire 96 to a source 97 of welding current. Wires 98 and 99 of solenoid 66 extend from the solenoid to a female plug 100 mounted on the helmet 11. A male plug 101 matably received by the plug 100 has wires 102 and 103 which communicate through the plug to wires 98 and 99, respectively. Wire 102 extends to low voltage source 104 which may be 12 or 24 volt direct current obtained in any known manner, such as a standard battery. Wire 105 extends from the remaining terminal of the source 104 to a terminal of push button switch 106, the remaining terminal of which connects to wire 103. The push button switch 106 is of a type which will form a closed circuit only when continually manually depressed by an operator. Accordingly the switch 106 acts as a dead-man's control to assure that the solenoid 66 is not energized to clear chamber 33 unless the switch 106 is closed, and the chamber 33 remains in a darkened condition until the button 106 is depressed. The switch 106 is positioned on the electrode holder 94 where it may be conveniently operated by the user while still holding the electrode holder 94. Typically the low voltage power source 104 used in conjunction with the invention may be mounted on the power equipment which is always nearby a welding operation and need not be carried by the operator.

In operation, the operator first advances or retracts adjusting screw 88 causing the spring 85 to become increasingly tensioned or untensioned, respectively. With each increasing increment of tension applied to the spring 85, restoring force generated by the compressed spring urges moving solenoid 68 toward the reservoir 53 moving the diaphragm 64 further into the reservoir. As the diaphragm occupies and increasingly greater volume of the reservoir 53 more fluid 78 is forced from the reservoir and along channel 54 and hose 56 to the entrance 35 of manifold 32. Fluid entering the manifold 32 leaves it through exit orifices 34 which discharge fluid into the slot 26 of chamber 33 causing the panels to move outwardly away from one another to extended position 30.

As the panels 12 and 14 move outwardly away from one another the seal 28 extending between their peripheries stretches and urges the manifold 32 downwardly into the slot 26 defined by the bevels 20 of the panels, the manifold thereby aiding in keeping the panels 12 and 14 spaced apart by serving as a wedge. As fluid is urged from the reservoir, this wedge effect of the manifold results in the fluid more easily entering the chamber 33 between the panels and thereby more rapidly darkening the chamber. As fluid continues to be supplied to the chamber, the panels 12 and 14 pivot about the manifold 32 as the portions 108 and 109 opposite the beveled edges of the panels move outwardly and apart from the initial position 110 shown in FIG. 3 to the final position 111. As the panels 12 and 14 separate and the intervening chamber 33 fills with light obstructing fluid 78, substantially less light passes through the chamber thereby effectively shielding the operator's eyes during welding.

By properly adjusting the screw 88, the opacity of the chamber 33 may be carefully controlled to provide comfort and protection to a user. It should be understood that while the solenoid 66 is unenergized the chamber is filled with fluid 78 and in extended position 30 thereby permitting minimal light to pass therethrough.

When welding is to be done, the operator places the helmet 11 on his head and then pushes the button 106 on the weld electrode holder 94. Closing of switch 106 permits current to flow from low voltage source 104 along wire 105, through switch 106, along wire 103 and 99 to the coil of solenoid 66, energizing it and returning to the voltage source 104 through wires 98 and 102. As the solenoid is energized, moving plunger 68 slides in the direction of arrow 113, resulting in the diaphragm 64 moving from the position 76 to position 74, compressing the spring 85 and generating a restored force on the plunger.

As the diaphragm 64 moves to position 74, it draws fluid 78 from chamber 33 into the exit orifices 34 of manifold 32 and thence through the manifold 32 and hose 56 to channel 54 and the reservoir 53, clearing the chamber 33. Because the stretchable seal 28 interconnecting the panels 12 and 14 has been tensioned by the panels 12 and 14 being in extended position 30, the stretchable seal exerts a restoring force tending to pull the panels 12 and 14 toward one another to further aid in the evacuation of fluid from the chamber therebetween. Simultaneously, the effects of atmospheric pressure are applied to the outer surfaces 24 of each of the panels further aiding in the urging of the panels toward one another. As the stretchable seal 28 contracts, pulling the panels toward one another, it pulls the manifold 32, which it is adhesively attached, upwardly out of the slot 26 thereby further aiding in the movement of the panels toward unextended position 25. It is not essential that all fluid be evacuated from between the panels and it has been found helpful that some fluid remain in the chamber to provide a very slight darkening effect.

The particular solenoid 66 selected for use with the device 50 should have an operating characteristic which results in the movement of diaphragm 64 from position 76 to 74 in a first time period which is substantially longer than the time period required for the spring 85 to move the diaphragm from position 74 to 76. Selecting the operating characteristic of the solenoid with these properties in mind results in the fluid being evacuated from the chamber 33 during a more gradual time interval of one to two seconds which permits the wearer's eyes to adapt themselves to the changing light conditions. This is particularly helpful when the eyes must become accustomed to bright sunlight after being protected by the darkened apparatus 10, and the gradual transition permitted by a properly selected solenoid can significantly reduce eye strain and fatigue.

When the chamber 33 has cleared, the operator looks through it, aligning his work piece with the welding electrode and when ready to commence welding releases the button 106 which he has been retaining in a closed condition. As the switch 106 opens, current flow to the solenoid 66 ceases and the restoring force of spring 85 immediately pushes the plunger 68 toward the reservoir 53, the diaphragm 64 immediately moving additional fluid 78 from the reservoir along channel 54 and hose 56 into the manifold 32. Fluid in the manifold leaves the manifold through exit orifices 34, entering the slot 26 of chamber 33. AS fluid entering chamber 33 begins pushing the panels 12 and 14 outwardly away from one another causing the seal 28 to stretch, the seal in turn urges the manifold 32 downwardly into the slot 26 defined by the bevels 20 of the panels. The downward movement of the manifold has a wedging effect and aids in the rapid filling of the chamber with fluid. Due to the amount of force delivered to the plunger 68 by spring 85, fluid flow into the chamber 33 is substantially immediate, causing rapid darkening of the chamber to protect the eyes of the user from the intense light of the welding arc.

While the invention functions effectively with the panels 12 and 14 interposed between the eyes of the viewer and the welding arc, it may at times be desirable to interpose an additional safety shield 44 across the aperture 15 on the outside of the helmet 11 to assure that the panal 14 is not easily broken or damaged due to impact between it and swinging or falling objects encountered at the work site. Use of the panel 44 provides an intercepting layer to preserve the integrity of the panels 12 and 14. In addition, an inner safety shield 114 may be positioned within the helmet to provide further protection to the panel 12. The panel 114 is mounted against a shoulder 115 and retained in place by a frame 116. An outer decorative cover plate 118 completely closes the cavity 48, protecting the fluid transfer device 50 from the elements and accidental damage.

Accordingly the described invention results in a welding helmet which is substantially easier to use, requiring no physical movements of the head to close the filter plate over the viewing tunnel while providing complete protection for the user during welding and providing virtually unobstructed vision of his work piece while the welding arc is out. Accordingly the invention results in substantially better welding due to improved vision immediately before actuating the welding equipment even when used by relatively inexperienced or student welders.

While a particular form or embodiment of the invention has been shown and described herein for illustrative purposes and the construction and arrangement of the components thereof have been disclosed and discussed in detail, it is to be understood that the invention is limited neither to the mere details or relative arrangement of parts, nor to its specific embodiment shown herein, but that extensive deviations from the illustrated forms or embodiments of the invention may be made without departing from the spirit of the invention.

What is claimed is:

1. A variable opacity light filtering apparatus comprising:
   a pair of fluid impervious panels having at least partial transmission of the visible light spectrum, said panels being in confronting juxtaposed relationship with one another and having matching, closely adjacent peripheries;
   a stretchable seal interconnecting said peripheries of said panels and forming a fluid tight seal between said peripheries to define a fluid receiving chamber between said panels and seal, said seal being stretchable to permit movement of said panels between an unextended position wherein said panels are spaced a first distance apart and an extended position wherein said panels are spaced a second distance apart, each said panel having an elongated edge with a bevel therealong, said edges being adjacent and parallel and the bevels confronting one another and cooperating to define a slot therebetween; and a fluid transfer device connected in fluid flow relationship to said chamber and including light obstructing fluid, said transfer device selectively delivering said fluid to said chamber to urge said panels and said seal from said unextended position to said extended position as fluid flows into said chamber to increase opacity of said chamber to substantially reduce light transmission through said chamber, said fluid transfer device including an elongate manifold adhesively retained by said seal and having a plurality of exit orifices for fluid, said manifold being within said chamber adjacent said slot and oriented parallel to said edges and positioned to release fluid from said exit orifices into said slot, said manifold being moved toward and away from said slot by said seal and descending into said slot as said panels and said seal move to extended position so the manifold wedges said panels apart to increase the rate at which said fluid fills said chamber, said manifold ascending from said slot as said panels and seal return to unextended position to increase the rate at which fluid leaves said chamber and enters said fluid transfer means.

2. In combination with a welder's helmet having a viewing aperture, an improved variable opacity light filtering apparatus, comprising:

a pair of fluid impervious panels having at least partial transmission of the visible light spectrum, said panels being in confronting juxtaposed relationship with one another and having matching, closely adjacent peripheries with each said panel having an elongated edge with a bevel therealong, said edges being adjacent and parallel and the bevels confronting one another and cooperating to define a slot therebetween;

a stretchable seal interconnecting said peripheries of said panels and forming a fluid tight seal between said peripheries to define a fluid receiving chamber between said panels and seal, said seal being stretchable to permit movement of said panels between an unextended position wherein said panels are spaced a first distance apart and an extended position wherein said panels are spaced a second distance apart;

said panels and said seal being mounted on said helmet for movement between said unextended position and extended position, said panels being positioned across said viewing aperture such that all light passing through said viewing aperture must pass through said panels before reaching the interior of said helmet;

a fluid transfer device carried by said helmet and connected in fluid flow relationship with said chamber and including light obstructing fluid, said transfer means selectively delivering said fluid to said chamber to urge said panels and said seal from said unextended position to said extended position as fluid flows into said chamber and increases opacity of said chamber to substantially reduce light transmission through said chamber, thereby protecting the eyes of an operator from excessive light generated by welding; and said fluid transfer device further including an elongate manifold retained by said seal and having a plurality of exit orifices for fluid, said manifold being within said chamber adjacent said slot and oriented parallel to said edges and positioned to release fluid from said exit orifices into said slot, said manifold being moved toward and away from said slot by said seal and descending into said slot as said panels and said seal move to extended position so the manifold wedges said panels apart along said slot to increase the rate at which said fluid fills said chamber, said manifold ascending from said slot as said panels and seal return to unextended position to increase the rate at which fluid leaves said chamber and enters said fluid transfer means.

3. The invention of claim 2 wherein said manifold provides a pivot for said panels, the portions of the periphery of said panels opposite said beveled edges of said panels moving toward and away from one another as said panels pivot about said manifold, said portions pivoting away from one another as fluid is delivered into said chamber with said manifold descended into said slot, and pivoting toward one another as fluid is withdrawn from said chamber with said manifold descended into said slot.

4. In combination with a welder's helmet having a viewing aperture, an improved variable opacity light filtering apparatus, comprising:

a pair of fluid impervious panels having at least partial transmission of the visible light spectrum, said panels being in confronting juxtaposed relationship with one another and having matching, closely adjacent peripheries;

a stretchable seal interconnecting said peripheries of said panels and forming a fluid tight seal between said peripheries to define a fluid receiving chamber between said panels and seal, said seal being stretchable to permit movement of said panels between an unextended position wherein said panels are spaced a first distance apart and an extended position wherein said panels are spaced a second distance apart;

said panels and said seal being mounted on said helmet for movement between said unextended position and extended position, said panels being positioned across said viewing aperture such that all light passing through said viewing aperture must pass through said panels before reaching the interior of said helmet;

a fluid transfer device carried by said helmet and connected in fluid flow relationship with said chamber and including light obstructing fluid, said transfer means selectively delivering said fluid to said chamber to urge said panels and said seal from said unextended position to said extended position as fluid flows into said chamber and increases opacity of said chamber to substantially reduce light transmission through said chamber, thereby protecting the eyes of an operator from excessive light generated by welding; and said fluid transfer device including:

a fluid reservoir to contain said fluid, said reservoir in fluid flow communication with said chamber;

means for moving said fluid into and out of said reservoir; and an electrical solenoid with a movable plunger coupled to said means for moving said fluid, said solenoid operatively electrically connected to move said fluid from said chamber into said reservoir when energized during a first predetermined period.

5. The invention of claim 4 wherein said fluid transfer device includes a spring mounted to said helmet and to said solenoid plunger, biasing said solenoid plunger in a rest position adapted to cause said means for moving fluid to urge fluid out of said reservoir and into said chamber so as to keep said panels and seal in extended position when said solenoid is unenergized, said spring having a spring coefficient adapted to insure that fluid enters said chamber at a rate causing said panels to move from unextended to extended position in a second predetermined period shorter than said first period.

6. The invention of claim 5 wherein said helmet includes a screw threadedly mounted to said helmet and mounted to said spring to move said spring toward and away from said solenoid plunger as said screw is advanced and retracted respectively, through said helmet, thereby controlling the rest position of said solenoid plunger.

7. The invention of claim 4 wherein said helmet has a cavity adjacent said viewing aperture and said solenoid and spring are positioned in said cavity.

8. The invention of claim 4 and further including an electrode holder, and an electrical switch mounted on said holder and electrically connected to said solenoid to energize said solenoid when said switch is closed and electrical energy is supplied to said switch.

* * * * *